Sept. 29, 1964 W. F. SIMON ETAL 3,151,256

SCHMITT TRIGGER HAVING NEGATIVE SET AND RESET VOLTAGE LEVELS DETERMINED BY INPUT CLAMPING NETWORKS

Filed Aug. 18, 1961 2 Sheets-Sheet 1

INVENTORS
WILLIAM F. SIMON
ROBERT D. TORREY

BY William E. Cleaver

ATTORNEY

Sept. 29, 1964 W. F. SIMON ETAL 3,151,256

SCHMITT TRIGGER HAVING NEGATIVE SET AND RESET VOLTAGE LEVELS DETERMINED BY INPUT CLAMPING NETWORKS

Filed Aug. 18, 1961 2 Sheets-Sheet 2

United States Patent Office 3,151,256
Patented Sept. 29, 1964

3,151,256
SCHMITT TRIGGER HAVING NEGATIVE SET AND RESET VOLTAGE LEVELS DETERMINED BY INPUT CLAMPING NETWORKS

William F. Simon, Oreland, and Robert D. Torrey, Philadelphia, Pa., assignors to Sperry Rand Corporation, New York, N.Y., a corporation of Delaware Filed Aug. 18, 1961, Ser. No. 132,368
7 Claims. (Cl. 307—88.5)

The present invention relates to a trigger circuit and, more particularly, to a trigger circuit which provides a square wave output signal in response to an input signal whose value is either greater or less than a predetermined value.

The Schmitt trigger is a trigger device which provides a square wave output signal for as long a period of time as the input signal applied thereto is greater than a certain positive voltage value (in the positive input signal mode) or is less than a certain negative voltage value (in the negative input signal mode). The Schmitt trigger is normally used as a zero voltage detector and normally follows a hysteresis pattern, i.e., being set at one voltage level and reset at a different voltage level.

When signals are produced from a magnetic medium such as a magnetic tape or a magnetic drum, the signals do not assume a true sine wave form (see FIGURE 2). Because the recovered signals have a value of approximately ground for a relatively long period (see section "*b*," FIGURE 2) if the Schmitt trigger is activated at ground potential, noise will cause the circuit to be erroneously triggered. In addition, since it has been the practice to transfer a Schmitt trigger at the zero voltage level, or at the ground voltage level, when signals from the magnetic medium are applied to the Schmitt trigger, as input signals, it has been found that the trigger can be erroneously set or reset because of the variation in recording density.

Accordingly it is an object of this invention to provide an improved Schmitt trigger.

It is a further object of the present invention to provide a Schmitt trigger which will not be susceptible to erroneous triggering action in response to noise signals.

It is a further object of the present invention to provide a Schmitt trigger which is not susceptible to erroneous triggering action in response to variations in recording density.

In accordance with a feature of the present invention a first network including a diode and a voltage divider is provided and connected to both of the emitter elements of the two transistors employed in the trigger circuit. The voltage divider portion of the first network provides a reference voltage to the circuit which establishes the value above which the input signal must rise in order to transfer the trigger to its set condition.

In accordance with another feature of the present invention a second network including a diode and a voltage divider is provided and is connected to both of the emitter elements of the two transistors in the trigger circuit. The voltage divider of the scond network provides a reference voltage to the circuit which establishes the value below which the input signal must pass in order to transfer the trigger to its reset condition.

In accordance with another feature of the present invention the voltage divider portions of each of the first and second networks provide reference voltages which establish that both the set input signal value and the reset input signal value are both sufficiently displaced with respect to ground, so that the timing of the response will be relatively insensitive to a noise signal input.

The above-mentioned and other features and objects of this invention will become more apparent by reference to the following description taken in conjunction with the accompanying drawings wherein.

Figure 2:
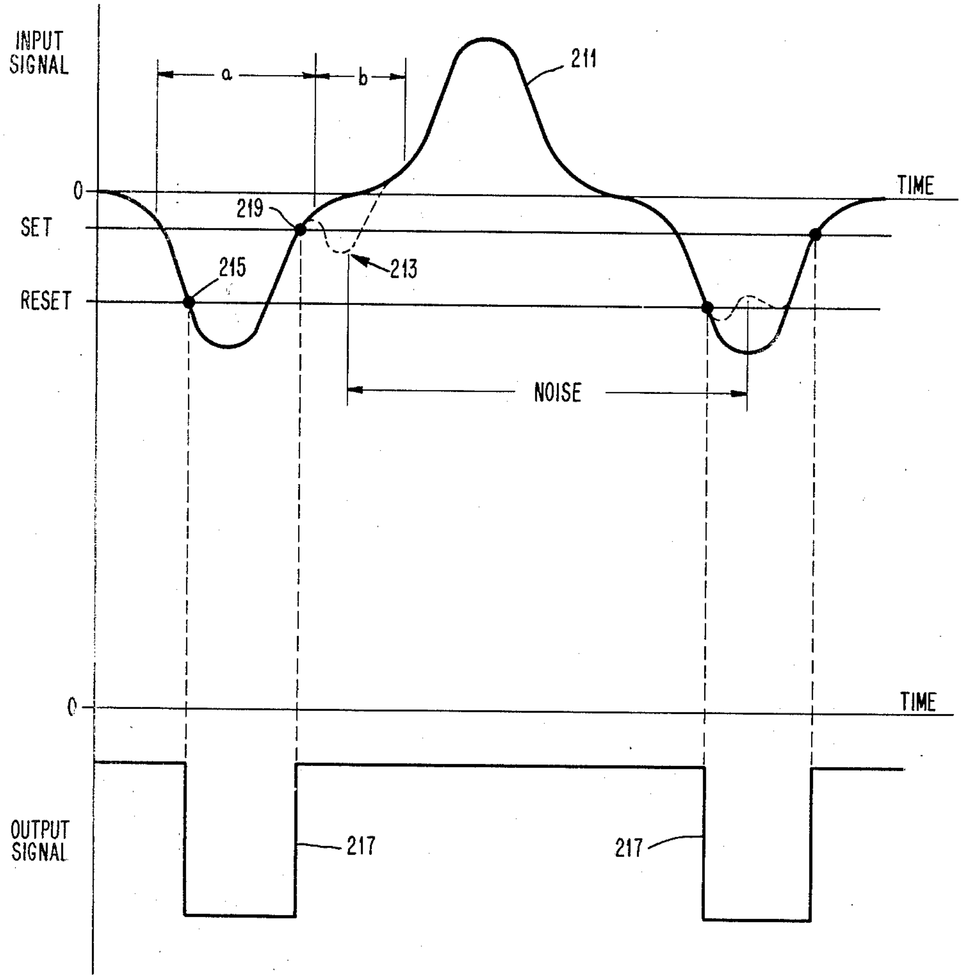
FIGURE 2 is a graphic display showing the relationship between the applied input signal, the set and reset voltage levels, and the output signal.

Consider first FIGURE 2 which shows the applied input signal 211 which is generated from a magnetic medium such as a magnetic tape. As was suggested earlier the signal from a magnetic tape does not assume the form of a true sine wave and the portion of the applied input signal labeled "*b*" represents the main deviation of the signal from a true sine wave. The length of the period "*b*" varies with the density of the magnetic recording while the length of the period "*a*" remains relatively constant.

If the Schmitt trigger were to be fired or transferred at the zero voltage level, it would be transferred when the input signal was assuming the values in the "*b*" portion of curve 211. It can be readily seen by examining or studying curve 211 that if there were a slight voltage deviation caused by the addition of noise and the Schmitt trigger were being triggered at the zero cross-over, the time that the trigger would be transferred would vary since the curve within the "*b*" portion does not have a very steep angle. If the "*b*" portion were extended in time, multiple sets and resets might occur in the "*b*" region.

It can be seen in FIGURE 2 from the dashed lines labeled "Set" and "Reset" that this particular Schmitt trigger is transferred to its reset side at a negative value potential (−0.7 volt) which is relatively lower than the negative potential value (−0.2 volt) which will transfer it to its set condition. By having both the reset and the set input signals assume values which are more negative than the zero potential level, the addition of noise voltage does not provide erroneous transfers of the Schmitt trigger, and will produce only slight changes in timing. As can be seen in FIGURE 2 the noise signal is shown as fluctuating or swinging around both the set and reset levels. A second advantage can be seen here in that by separating the set and reset values even noise which might occur at the time of triggering would not introduce additional transfers of the Schmitt trigger, because of the relatively steep waveform at this point. In other words, after the Schmitt trigger has been transferred to its set condition if the noise should drive the input signal as far negative as point 213 it would not transfer the Schmitt trigger to its reset condition because point 213 is more positive than the necessary negative value level as shown at 215.

Figure 1:
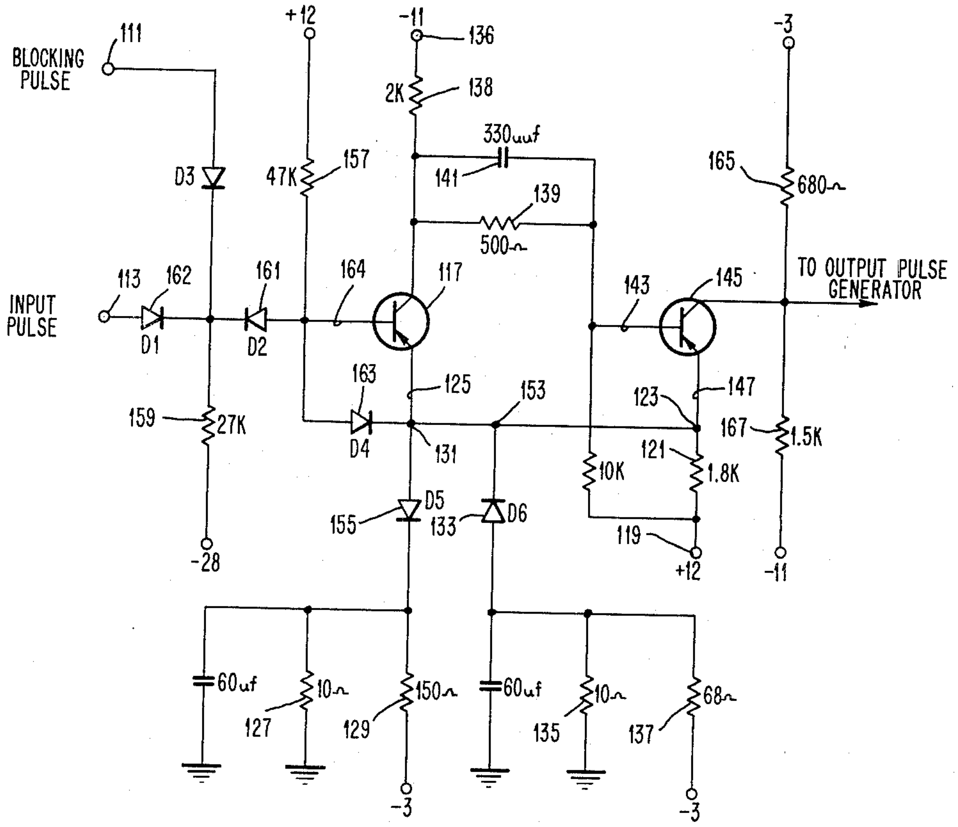
FIGURE 1 is a schematic of the improved Schmitt trigger.

Keeping the general operation in mind, consider FIGURE 1 which is a schematic of the circuitry employed in the present Schmitt trigger. The values of the resistors and the capacitors shown in the circuit are examples of a particular circuit which operates in response to a reset input signal having a value of −0.7 volt and a set input signal value of −0.2 volt. If the circuit is to be operated with a different spread between the set and reset levels or with different values of set and reset signals obviously the values of the resistors and the capacitor would have to be changed.

There is applied to the input terminal 111 a blocking signal whose value swings from −3 volts to 0 volt and as long as this blocking signal is applied to the terminal 111 the Schmitt trigger cannot be transferred into its reset conditions. When the blocking signal is not present, there is an input signal applied to the terminal 113. When the input signal goes as negative or more negative than −0.7 volt the PNP transistor 117 is turned on.

When the transistor 117 is turned on there is emitter current supplied from the +12 volt source at 119. The current from the +12 volt source at 119 is transmitted to the resistor 121, from the terminal 123 to the emitter element 125.

The voltage divider arrangement in the first network which includes the resistors 127 and 129 provides that the voltage at terminal 131 is −0.2 volt when transistor 117 is conducting. Since the voltage at the terminal 131 is −0.2 volt the diode 133 is electrically removed from the circuit and therefore no current is supplied from the voltage divider of the second network comprised of the resistor 135 and the resistor 137.

It becomes clear that if the terminal 131 is held to a voltage value of −0.2 volt, the input signal must go more positive than −0.2 volt in order that the transistor 117 will be cut off. While the transistor 117 is conducting the present Schmitt trigger is considered to be in the reset condition. When the input signal begins to rise (become more positive) to its set input signal level, as can be seen in FIGURE 2, and the input signal attains the value of −0.2 volt or greater the transistor 117 will be cut off. When the transistor 117 is cut off, a negative voltage value from the negative source −11 volts at 136 is applied through resistor 138, through resistor 139 and capacitor 141 to the base element 143. When this negative potential is applied to the base element 143 the transistor 145 commences to conduct and current passes from the +12 volts source 119 to emitter 147. The voltage divider comprising the resistors 135 and 137 provides a voltage value of −0.7 volt at the terminal 152 and since the resistance values of 135 and 137 are relatively small a substantial portion of the emitter current supplied to the transistor 145 is supplied through the diode 133. Since this voltage divider network as well as the voltage divider network consisting of resistors 127 and 129 are of a low impedance, they act as constant voltage sources. The sixty microfarad capacitors across resistors 127 and 135, respectively, act as a low impedance bypass to ground for high frequency pulses. These capacitors aid in holding the biasing voltages constant, since their decay time constant is much greater than the pulse time through which they decay.

With the potential value being at −0.7 volt at terminal 152 the diode 155 is effectively cut off and therefore the first network is electrically removed from the circuit. It becomes clear that if the value of the terminal 152 is −0.7 volt then the potential also appears at the emitter 125 and in order to cause the transistor 117 to conduct once again, a negative valued input signal of a more negative value than −0.7 volt must be applied. In this manner the Schmitt trigger is transferred from its set to its reset condition.

Other features in this circuit which have not been discussed are provided for purposes of refinement and stability. The resistor 157 in conjunction with diode 161 forms a positive clipper device while the resistor 154 in conjunction with the diode 162 provides a negative clipper device. The positive clipper restricts the range of the input signal to the input transistor 117 in order to prevent emitter-base or emitter-collector junction breakdowns; the negative clipper restricts the negative swing of the input signal in order that transistor 117 will not be overdriven and thereby introduce distortion into the circuitry.

The diode 163 serves to limit the reverse bias applied to the base element 164 when the transistor 117 is in a cut-off condition. The two resistors 165 and 167 are provided to simply supply an effective power supply voltage level intermediate between voltages readily available elsewhere in the circuitry.

Examine once again FIGURE 2 in order that a comparison can be made between the output signal and the input signals. As can be seen in FIGURE 2, the output signal 217 is composed of two square wave pulses although there might be many more depending on what sort of an input signal is applied. The square wave pulses begin at the time that the input signal crosses the reset threshold or just opposite the point 215. The square wave pulse ends at the time that the input signal crosses the set input signal level or opposite the point 219. If there were to be an erroneous triggering of the Schmitt trigger or a change in its timing by noise, the square wave pulse 217 might be formed more narrowly, or more widely, or there might be a series of pulses instead of the single pulse 217, all of which would be undesirable. It follows then that with the use of the present improvement of the Schmitt trigger the stability of the output signal is maintained in the presence of noise and with variations of recording density.

While we have described above the principles of our invention in connection with specific apparatus, it is to be clearly understood that this description is made only by way of example, and not as a limitation of the scope of our invention as set forth in the objects thereof, and in the accompanying claims.

What is claimed is:

1. A trigger circuit having reset and set conditions of conduction wherein the voltage level of the reset input signal differs from the voltage level of the set input signal and both of said input signal voltage levels are negative with respect to ground potential comprising: first and second current conducting devices each having an input element, an output element and a control element; input signal means connected to the control element of said first electron conducting device; circuitry means coupling the output element of said first current conducting device to the control element of said second current conducting device such that when said first current conducting device conducts it will cause said second current conducting device to be cut off and such that when said first current conducting device is nonconducting said second current conducting device will be conducting; load means connected to said output element of said second current conducting device; first network means including a first unidirectional current conducting device independently coupled to the input elements of both of said current conducting devices to provide a first constant valued voltage source thereto which determines the voltage level of said set input signal; and second network means including a second unidirectional current conducting device independently coupled to the input elements of both of said current conducting devices to provide a second constant valued voltage source thereto which determines the voltage level of said reset input signal.

2. The trigger circuit according to claim 1 wherein said first network means further includes a voltage divider arrangement having a center tap, said center tap being connected to said first unidirectional current conducting device of said first network thereby providing said first constant valued voltage at the point wherein said center tap is connected to said first unidirectional current conducting device.

3. A trigger circuit having reset and set conditions of conduction wherein the voltage level of the reset input signal differs from the voltage level of the set input signal and both of said input voltage levels are negative with respect to ground potential comprising: first and second transistors each having an emitter, a collector, and a base element; input signal circuitry means connected to the base element of said first transistor; circuitry means coupling the collector element of said first transistor to the base element of said second transistor such that when said first transistor is conducting said second transistor will be cut off and when said first transistor is not conducting said second transistor will be conducting; load means connected to said collector element of said second transistor; first voltage divider network having a center tap whereat a first constant valued voltage is independently provided; a first diode connected from said center tap of said first voltage divider network to the emitter elements of both said first and said second transistors; second voltage divider network independently providing at a center tap thereof a second constant valued voltage; a second diode means connecting said second voltage divider network to both of the emitter elements of said first and said second transistors; said first and said second constant valued voltages respectively determining the set and reset input signal values of said trigger circuit and being different one from the other.

4. A trigger circuit according to claim 3 wherein said first diode has its cathode connected to said center tap of said first divider network and wherein said second diode has its anode connected to said center tap of said second voltage divider network.

5. A trigger circuit according to claim 4 wherein said first voltage divider network further includes a capacitor connected to ground from said center tap and wherein said second voltage divider network further includes a capacitor connected to ground from said center tap.

6. A trigger circuit according to claim 3 where there is included a third diode connected between the base element of said first transistor and the emitter element of said first transistor in order to prevent the second voltage level when applied from said second voltage divider network from triggering said first transistor into conduction.

7. A trigger circuit according to claim 4 wherein said input signal circuitry includes a first and second resistor respectively connected to the cathode and the anode of a fourth diode, the cathode of said fourth diode being connected to the input terminal of said trigger circuit through a fifth diode; said first resistor in conjunction with said fifth diode forming a negative clipper device; and said second resistor in conjunction with said fourth diode forming a positive clipper device.

References Cited in the file of this patent

UNITED STATES PATENTS

| | | |
|---|---|---|
| 2,900,606 | Faulkner | Aug. 18, 1959 |
| 2,921,192 | Casey et al. | Jan. 12, 1960 |
| 3,041,541 | Gerr | June 26, 1962 |

OTHER REFERENCES

"Pulse and Digital Circuits" (Millman and Taub), published by McGraw-Hill, 1956, pages 164–168 relied on.